April 8, 1969   J. H. LEMELSON   3,437,783
MATTE STRUCTURE AND METHOD OF PRODUCING SAME
Filed July 26, 1966
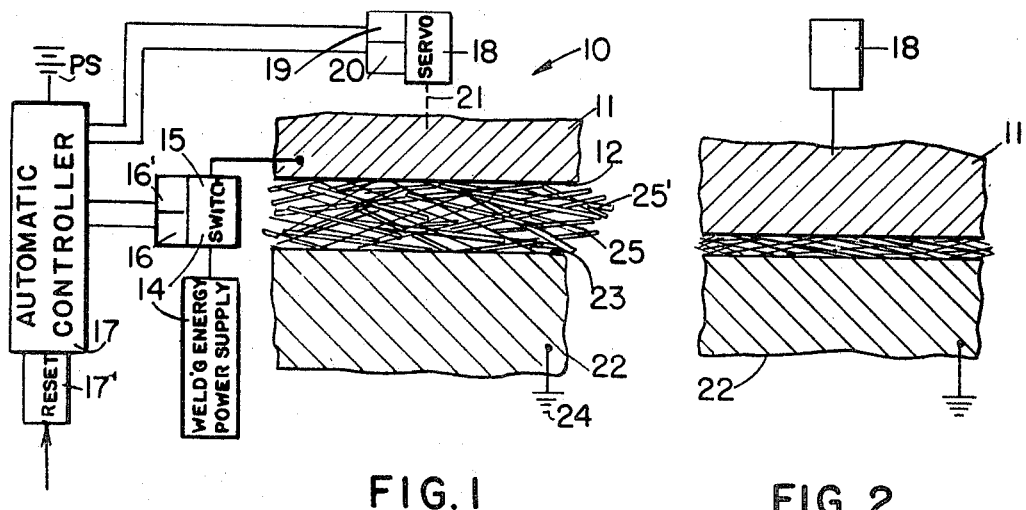
FIG. 1   FIG. 2
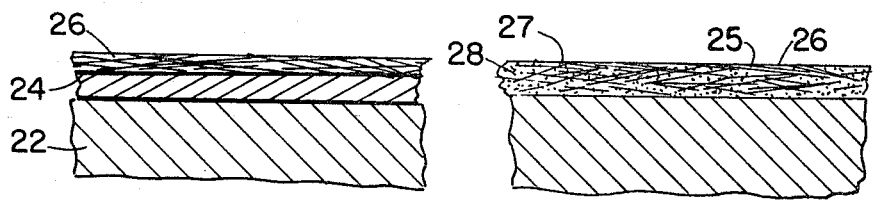
FIG. 3   FIG. 4
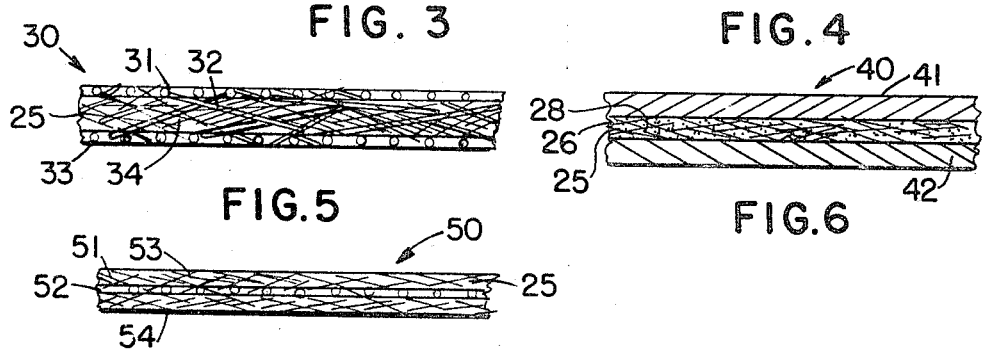
FIG. 5   FIG. 6
FIG. 7
INVENTOR.
Jerome H. Lemelson

United States Patent Office 3,437,783
Patented Apr. 8, 1969

3,437,783
MATTE STRUCTURE AND METHOD OF
PRODUCING SAME
Jerome H. Lemelson, 85 Rector St.,
Metuchen, N.J. 08840
Continuation-in-part of applications Ser. No. 239,034,
Nov. 20, 1962, and Ser. No. 241,904, Dec. 3, 1962. This
application July 26, 1966, Ser. No. 573,148
Int. Cl. B23k 9/00
U.S. Cl. 219—117                8 Claims

ABSTRACT OF THE DISCLOSURE

Methods for producing new and improved matte structures and composite structures which include arrays of welded filaments.

The composite structures have applications as filter elements and structural elements for use at elevated temperatures and where extreme physical loading is experienced. The structures are made of elongated wire or whisker elements which are welded together where they cross.

Composite matte structures are also provided which include plate-like, frame or lattice support means for a matte of filament elements which are welded to the support means.

---

This invention relates to new and improved composite articles and techniques for fabricating composite articles of weldable filaments such as metal whiskers, wires and the like and is a continuation-in-part of my copending application Ser. No. 239,034, entitled, Composite Article, filed Nov. 20, 1962 and Ser. No. 241,904, filed Dec. 3, 1962, for Composite Screen Assembly, now Patent No. 3,276,513, dated Oct. 4, 1966. In particular, this invention defines new structures in matte-like formations of high strength filaments, methods of producing same and improved composite structures thereof.

It is a primary object of this invention to provide a new and improved structure in a skeletal arrangement of filaments and a method for producing same.

Another object is to provide a new and improved matte formation of filaments applicable for producing composite structures of extreme strength.

Another object is to provide a method for welding a plurality of filament elements together to provide new and improved composite articles thereof.

Another object is to provide new and improved apparatus for forming new and improved composite sheet material and articles.

Another object is to provide new and improved composite sheet, plate and articles which are filament reinforced.

Another object is to provide new and improved composite sheet materials capable of conducting fluid for heat transfer and/or filtering purposes.

Another object is to provide new and improved composite structures made of filaments or whiskers of metals and nonmetals having improved physical characteristics for such applications as shock absorption, vibration control, sound absorption and control, chemical catalysts and the like.

Another object is to provide a new improved structure in an abrasive member such as an abrasive sheet or grinding wheel made of composite material including a plurality of welded filaments, a filler material therefor and abrasive bits held in the matrix.

Another object is to provide a new and improved apparatus for forming composite articles and sheet material.

Another object is to provide a new apparatus and method for forming structural members by combining extrusion and/or casting and draw forming procedures in a single operation.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

In the drawings:

FIG. 1 is a side view in cross section of fragmentary portions of a welding apparatus and controls therefor for forming a matte or porous sheet of fibers or filaments;

FIG. 2 shows the apparatus of FIG. 1, compressing and welding the filaments into a thinner matte or sheet;

FIG. 3 is a cross sectional view of a fragment of one of the welding members of FIG. 1 with a composite article disposed against its surface;

FIG. 4 is a fragmentary view of a welding apparatus containing a modified form of filamented material produced thereon;

FIG. 5 is a fragmentary view of a modified form of filamented material produced by apparatus of the type shown in FIG. 1 and having a perforated metal sheet or screen welded to each surface thereof;

FIG. 6 is a fragmentary view of a modified form of the material of FIG. 4 having coatings or sheet members bonded or welded to its opposite surfaces; and FIG. 7 is a fragmentary view of a modified form of a filamented material having a screen member extending through the central portion thereof.

FIG. 1 illustrates an apparatus operative to produce a new and improved mesh or matte structure from individual filaments, fibers or whisker elements disposed in said apparatus. Such mesh structure is denoted by the general notation 26 as illustrated in FIGS. 3 and 4, has various useful applications such as the fabrication of composite articles and panels which are reinforced by the matte, the fabrication of filters employing the matte and other structural elements which will be described.

In FIG. 1 a plurality of elongated filament elements 25 such as individual so-called single crystal whiskers or wires made of any suitable metal are disposed in a random array as a layer 25' on the upper surface 23 of an electrode plate, roller or die portion 22 of a press apparatus 10 which also includes a movable platen electrode 11 having a lower surface 12 operative to engage and compress the filament elements 25 therebetween and the member 22. Member 22 may comprise the lower platen of a compression press and member 11 the upper platen thereof or said members may comprise flat dies or dies of any suitable configuration which are secured to the base and upper platen of a reciprocating or rotary press or the like. Member 11 is shown electrically connected to a source 14 of direct or alternating current of sufficient potential to effect the resistance welding of the filament elements 25 together where they cross each other when the surface 12 of member 11 predeterminately compresses the filament elements against the upper surface 23 of the lower member 22. In other words, the members 11 and 22 serve a plurality of purposes including their movement together to compress the randomly arrayed filaments 25 into a more compact matte and to predeterminately shape same. Said members 11 and 22 also serve as resistance welding electrodes to transmit sufficient electrical energy to the filaments to effect resistance welding of the filaments to each other at those points along the length of the filaments which make surface contact with each other and, of course, present the highest resistance to the transmission of electrical energy from the electrode 11 to electrode 22 which is shown grounded by grounding means 24. As a result of the resistance welding action described, the elements 25 will remain substantially in the compressed state when electrode 11 is withdrawn from its downwardmost stroke location as illustrated in FIG. 2.

Illustrated schematically in FIG. 1 are elements for effecting control of the compression and welding apparatus. The upper die 11 is raised and lowered to move along suitable guide means (not shown) by a hydraulic, pneumatic or electrical servomotor designated 18 having an output shaft 21 operatively connected to the platen 11 and controls 19 and 20 which, when energized, effect the operation of the motor device 18 to respectively lower and raise the die member or platen 11.

Notation 14 refers to a source of suitable electrical potential which is electrically connected to conducting die 11 and has a bistable switching control means 15 including an input 16 thereto which, when energized, gates electrical potential from source 14 to the electrode 11 and a second input 16' which, when energized, deactivates a switching control associated with 14 for either deactivating the potential source or opening a switch connected therebetween and electrode 11. Any suitable automatic controller may be operative to predeterminately control the servo device 18 and electrical potential source 14 so that welding energy is provided only upon the predetermined compression of the filament or whisker elements 25 between the two press members 11 and 22. Illustrated in FIG. 1 is a self-recycling multicircuit timer 17 having an energizing input 17' thereto which, when pulsed, causes the controller 17 to cycle once and supply electrical energy or signals for controlling the servo 18 and the gating means 15 and 16 for the welding power supply 14. The input to the start cycle control 17' of controller 17 may be a manual push-button switch or a control activated by an automatic means when the proper amount or number of filaments elements 25 are deposited on the upper surface 23 of the lower platen 22. In other words, a suitable, automatically controlled feed means (not shown) may be utilized to feed a predetermined quantity or layer of filament elements to the platen 22 as illustrated in FIG. 1 and the same or auxiliary means may be utilized to remove the compressed and welded matte of filaments from the upper surface 23 of member 22 in a cycle which includes the generation of a further signal operative to activate the cycle controller 17.

While the matte 26 of compressed and welded filament elements 25 may be withdrawn from between the members 11 and 22 as an article of any suitable thickness and shape, it may also be welded to one or more members disposed between electrodes 11 and 22 or to the electrodes themselves which form part of a composite article.

In FIG. 3, a plate or sheet 24 of conducting material such as metal has been disposed on the upper surface of the electrode 22 forming a conducting path and the filament elements 25 disposed on top of said plate are shown compressed and welded not only together by the means described but also to the member 24. The lower elements of the layer thereof defining the matte 26 are welded to the upper surface of member 24 where they make surface contact therewith, by the same electrical energy utilized to weld the filament elements together. In other words, in a single stroke a composite article may be provided by the apparatus of FIG. 1 which comprises either a plurality of metal filaments which are compressed and are welded to each other, forming a matte or mesh structure or said welded filaments may be further welded to a sheet or plate disposed therebeneath, and, in certain instances, to a second sheet or plate disposed along the upper surface of the matte to form new and improved composite articles which may be utilized for forming reinforced structures, fluid filters or other purposes.

In FIG. 4 is shown a plurality of filaments of the type described which are disposed on the upper surface of a die or platen 22 or panel member forming a part of the composite article. Filling the interstices is a filler material 27 of any suitable composition. In a preferred embodiment of the invention, the filler material 27 may comprise a metal such as aluminum, titanium, copper or steel which is substantially reinforced by the compressed filament elements 25 or a ceramic or composite material such as aluminum oxide, titanium carbide, boron nitride, or other suitable metal or nonmetal including polymers or the like which completely fills the voids in the mesh 26 formed of the filament elements 25. Such material may be flowed into the voids in the filament elements prior to or after the welding of said elements and while the mesh is disposed against the die or some time thereafter.

In one mode of fabricating the composite material 28 of FIG. 4, powdered metal may be flowed to fill the voids in the mesh and may be compressed or sintered by the action of the press members described and heat generated across the electrodes by resistance heating means of the type described. In other words, the composite member or panel 28 may be fabricated by disposing a plurality of filament elements as a layer on the upper surface of a die such as 23 and, either before or after welding said elements together as described, flowing, pouring or spraying particles of metal or other suitable material to fill the interstices between the filament elements to form a unitary whisker or wire-reinforced solid member. If powdered metal is utilized, the generation of sufficient electrical potential between the press members or electrodes used to form the reinforced composite material may be utilized to melt or sinter the powdered material into a unitary mass with the filament elements extending through said mass as reinforcing means therefor. Here again, as in the embodiments described above, the filament reinforced composite of FIG. 4 may be solid through and through and may be formed per se or welded to a single sheet of metal or between two sheets of metal or suitable composite materials of any suitable shape.

New articles of manufacture which may be fabricated utilizing the apparatus described, are illustrated in FIGS. 5–7. In FIG. 5 is shown a new type of mesh or matte which may be utilized for reinforcing purposes or as a filter element. The composite structure 30 comprises an upper screen 31 made of substantially uniformly woven or otherwise arrayed filament elements 32 and a lower screen 33 made of similarly uniformly arrayed elements 34. Disposed between the upper screen 31 and the lower screen 33 is a matte array as described of filament elements or whiskers 25 which are compressed and resistance welded to each other as described and are also resistance welded to the upper and lower screen members 31 and 33. The screens 31 and 33 serve to define relatively smooth cappings members for the internal mesh 26 formed of the elements 25 and may also be made of perforated metal sheets. The structure illustrated in FIG. 5 may be formed to any suitable shape and may also include a filler material disposed between screen members 31 and 33 and provided as described. Members 31 and 33 may be disposed on both sides of a matte of the elements 25 prior to welding the entire assembly together as described.

In FIG. 6, a composite material 40 comprises a lower plate 42 having disposed on its upper surface a welded mesh or matte 26 as described which is filled with a suitable filler material 28 as described. A further plate 41 caps the upper surface of the filler comprising mesh 26 and material 28 and the two plates 41 and 42 are either welded or adhesively bonded to the material therebetween.

In FIG. 7, a composite material 50 is shown in sheet form and includes a matte or compressed and welded sheet 51 of metal, ceramic, glass or plastic filaments 25 as described and having disposed between the major faces 53 and 54 of the member 51, a screen member 52. The member 52, which may comprise woven or welded metal or plastic filaments or woven ceramic filaments may serve as a reinforcing means for the compressed matte 51 and/or as a conducting means for electricity. In the latter function, member 52 may serve as a resistance heating element to transfer heat to the welded or bonded elements of compressed matte 51 and fluid passing through or over said composite member 50. If the filaments 25 are conducting metal, the elements of member 52 may be copper, aluminum, niobium or other metal coated or covered with an insulating material such as a ceramic or oxide film to prevent grounding to the elements of the matte 51. If member 50 is used as a fluid filter medium, catalyst means for chemical reactions involving fluids or as an element in a magnetohydrodynamic apparatus or electrostatic apparatus, sufficient voltage may be applied across portions of member 52 to effect the desired glow discharge, electrostatic or electromagnetic action with respect to the surrounding fluid medium.

In the embodiment of FIG. 7, suitable metal, ceramic and/or plastic particulate material may be sintered in situ within the interstices of the elements 25 of member 51 which may also extend through element 52, applied thereto as described. Liquid metal, ceramic or plastic material may also be flowed or sprayed into the interstices and solidified in situ therein to provide a solid member 50.

The screen members 31, 33 and 52 of FIGS. 5 and 7 may comprise a perforated metal sheet or otherwise formed porous member.

I claim:
1. A method of fabricating a matte structure defined as a plurality of discrete electrically conducting elements which are joined together comprising the steps of: compressing a plurality of randomly arrayed, separate crisscrossing elongated weldable filamental elements together between welding dies brought together with sufficient force to cause all adjacent filaments to be compressed against each other in the areas where they cross over each other, said welding dies comprising electrodes operatively connected to a source of electrical energy, operating said welding electrodes to effect the resistance welding of said elongated elements together only along those areas where they cross to provide a contiguous skeletal structure of discrete and joined filaments.

2. A method in accordance with claim 1 in which said electrodes are shaped to compress only limited areas of the matte and weld the whisker elements crossing each other between said dies together where they cross.

3. A method in accordance with claim 1 in which said matte is made of wire-like electrically conducting thermoplastic elements which are separate from each other, said method comprising compressively engaging only certain areas of said matte between welding electrodes to energize by radiant energy conducted thereto heat and effect the fusion of certain portions of said elements between said electrodes.

4. A method in accordance with claim 1 in which the welding dies comprise spot electrodes and certain of the filaments are of irregular shape.

5. A method in accordance with claim 1 in which said filamental elements are pressure weldable metal and said dies are pressure welding dies, said method including the further step of pressure welding said filaments together along those areas where they cross each other by properly operating said dies to molecularly bond the filaments together.

6. A matte structure comprising an array of a plurality of discrete elongated, wire-like metal elements provided angular to and criss-crossing each other, said elongated metal elements arranged extending in depth a degree which is substantially greater than the diameter of the particular elements, said elements being compressed together and integrally resistance welded along those areas of the elements which engage each other where they cross so as to define a unitary and continuous matte-like formation of joined and discrete elements, and a metal support for said matte structure, said metal support being resistance welded to certain elements of said matte including elements of said matte in contact with said metal support.

7. A matte-like material in accordance with claim 6, said metal support being in the form of a sheet-metal frame, said frame being welded to a portion of the peripheral borders of said matte.

8. A matte-like material in accordance with claim 6 said metal support including a plurality of rod-like elements extending across said matte and being resistance welded to respective contacting portions of said matte.

References Cited

UNITED STATES PATENTS

| | | | |
|---|---|---|---|
| 3,087,233 | 4/1963 | Turnbull | 29—182 |
| 3,178,280 | 4/1965 | McGee et al. | 75—200 |
| 2,100,537 | 11/1937 | Conway | 29—471 |
| 3,113,202 | 12/1963 | Nolen et al. | 219—92 |

FOREIGN PATENTS 821,690  10/1959  Great Britain.

RICHARD M. WOOD, *Primary Examiner.*

B. A. STEIN, *Assistant Examiner.*

U.S. Cl. X.R.

75—200